(12) United States Patent
Carnevali

(10) Patent No.: US 8,037,904 B2
(45) Date of Patent: Oct. 18, 2011

(54) ANCHOR MOUNT

(76) Inventor: Jeffrey D. Carnevali, Seattle, WA (US)

( * ) Notice: Subject to any disclaimer, the term of this patent is extended or adjusted under 35 U.S.C. 154(b) by 823 days.

(21) Appl. No.: 11/821,093

(22) Filed: Jun. 19, 2007

(65) Prior Publication Data

US 2008/0092970 A1 Apr. 24, 2008

Related U.S. Application Data

(60) Provisional application No. 60/853,597, filed on Oct. 23, 2006.

(51) Int. Cl.
*F16L 55/10* (2006.01)
(52) U.S. Cl. ......... 138/89; 138/96 R; 220/235; 220/236; 220/238
(58) Field of Classification Search .............. 138/89, 138/96 R; 220/235, 236, 238
See application file for complete search history.

(56) References Cited

U.S. PATENT DOCUMENTS

| | | | |
|---|---|---|---|
| 820,469 A | 5/1906 | Bennet | |
| 955,500 A * | 4/1910 | Clark | 138/91 |
| 966,748 A | 8/1910 | Honecker | |
| 1,156,915 A | 10/1915 | Mazoyer | |
| 1,226,209 A * | 5/1917 | Harris | 138/89 |
| 1,239,225 A | 9/1917 | Sampson | |
| 1,464,646 A | 8/1923 | Cross | |
| 1,493,501 A | 5/1924 | Rice | |
| 1,850,040 A * | 3/1932 | Turner | 138/89 |
| 2,072,426 A | 3/1937 | Kraft | |
| 2,245,887 A * | 6/1941 | Wikander | 4/295 |
| 2,292,149 A | 8/1942 | Moeller | |
| 2,310,351 A * | 2/1943 | Bowan et al. | 138/89 |
| 2,312,738 A | 3/1943 | Ulanet | |
| 2,315,538 A | 4/1943 | Moeller | |
| 2,424,930 A | 7/1947 | Jackson | |
| 2,439,628 A | 4/1948 | Kopecky | |
| 2,445,325 A | 7/1948 | Hemp | |
| 2,493,452 A | 1/1950 | Grigg | |
| 2,506,362 A | 5/1950 | Hofmann | |
| 2,566,816 A | 9/1951 | Work | |
| 2,616,582 A | 11/1952 | Kappes et al. | |
| 2,867,243 A * | 1/1959 | Bowan | 138/89 |
| 2,886,067 A | 5/1959 | Maxwell et al. | |
| 2,946,491 A | 7/1960 | Bramming | |
| 2,978,138 A * | 4/1961 | Moeller | 220/235 |
| 3,114,528 A | 12/1963 | Forest | |
| 3,317,071 A | 5/1967 | Teeter | |
| 3,365,093 A | 1/1968 | Malenke | |
| 3,371,418 A | 3/1968 | Moeller | |
| 3,489,312 A | 1/1970 | Hunckler et al. | |
| 3,494,504 A * | 2/1970 | Jackson | 220/237 |

(Continued)

*Primary Examiner* — James Hook
(74) *Attorney, Agent, or Firm* — Charles J. Rupnick

(57) ABSTRACT

An anchor mount formed of a stopper having a thrust flange joined to a first end of a stem portion with an axial bore extending there through and a centering portion inclined between an overhanging portion of the flange and the stem portion; a part-spherical coupler presented on the stopper thrust flange opposite from the stem portion; a substantially resiliently deformable plug having an axial bore extended there through; an elongated shaft extendable through the respective axial bores of the stopper and the plug and having a threaded portion thereof extendable from a second end of the plug; an end cap having with an axial bore there through and being structured with an anti-rotation mechanism operable for resisting rotation of the end cap relative to the plug; and a mechanism for reversibly moving the end cap along the elongated shaft relative to the stem portion of the stopper.

20 Claims, 9 Drawing Sheets

U.S. PATENT DOCUMENTS

| | | |
|---|---|---|
| 3,550,635 A | 12/1970 | Schroer |
| 3,604,591 A | 9/1971 | Seltzer |
| 3,618,809 A | 11/1971 | Martino |
| 3,836,035 A | 9/1974 | Simibirdi |
| 4,060,100 A | 11/1977 | Miller et al. |
| 4,170,247 A | 10/1979 | Bates |
| 4,178,966 A | 12/1979 | Savor et al. |
| 4,209,163 A * | 6/1980 | Nordskog ........................ 251/96 |
| 4,254,801 A | 3/1981 | Gerthoffer et al. |
| 4,436,117 A | 3/1984 | Martin |
| 4,759,462 A | 7/1988 | Neglio |
| 4,765,374 A | 8/1988 | Ermold et al. |
| 4,930,657 A | 6/1990 | Walker |
| 4,982,763 A | 1/1991 | Klahn |
| 5,035,266 A | 7/1991 | Benson et al. |
| 5,044,403 A * | 9/1991 | Chen .............................. 138/89 |
| 5,297,691 A | 3/1994 | Bottcher |
| 5,307,841 A * | 5/1994 | Condon .......................... 138/90 |
| 5,348,085 A * | 9/1994 | Benson ........................ 166/92.1 |
| 5,429,394 A | 7/1995 | Olson |
| 5,735,425 A | 4/1998 | Beadle |
| 5,904,965 A | 5/1999 | Noel et al. |
| 5,927,000 A | 7/1999 | Bordes, Jr. |
| 5,931,516 A | 8/1999 | Holtman et al. |
| 5,978,233 A | 11/1999 | Rice |
| 6,079,150 A | 6/2000 | Setikas et al. |
| 6,176,267 B1 | 1/2001 | Dugan et al. |
| 6,357,170 B1 | 3/2002 | Bordes, Jr. |
| D456,237 S | 4/2002 | Sokurenko et al. |
| 6,419,104 B1 | 7/2002 | Sarajian |
| 6,453,603 B1 | 9/2002 | Baker |
| 6,526,689 B2 | 3/2003 | Moore |
| 6,659,513 B1 | 12/2003 | Ramsauer |
| 6,662,490 B1 | 12/2003 | Aesch, Jr. |
| 6,883,546 B1 | 4/2005 | Kobylinski |
| 7,055,454 B1 | 6/2006 | Whiting et al. |
| D588,902 S * | 3/2009 | Carnevali ...................... D8/354 |
| 2006/0255215 A1* | 11/2006 | Carnevali ................... 248/125.8 |
| 2008/0138152 A1* | 6/2008 | Carnevali ...................... 403/376 |

* cited by examiner

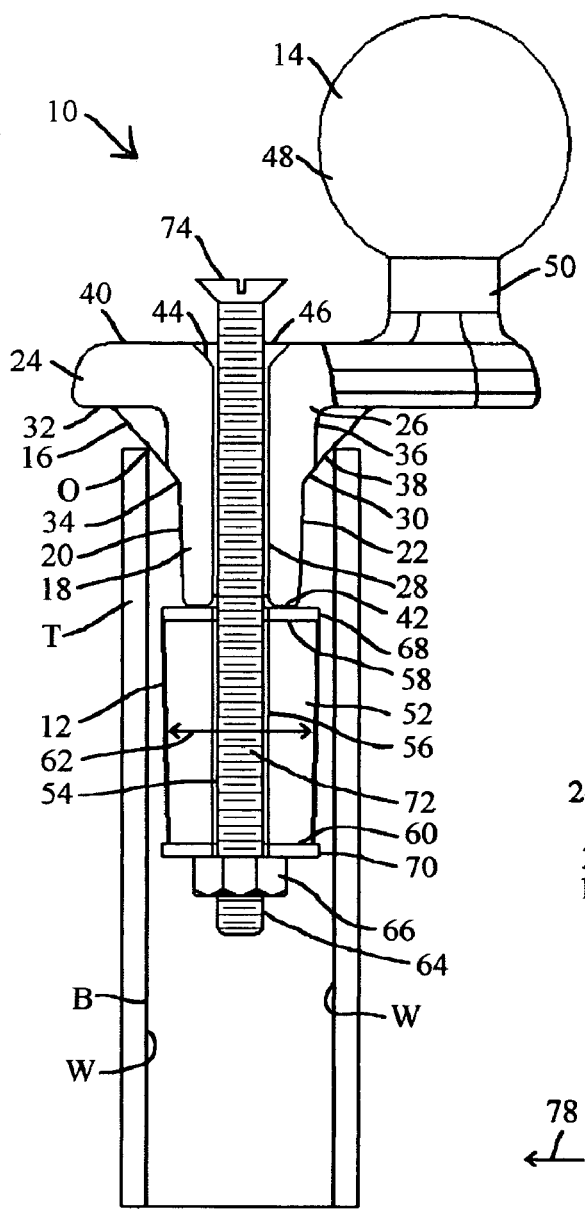
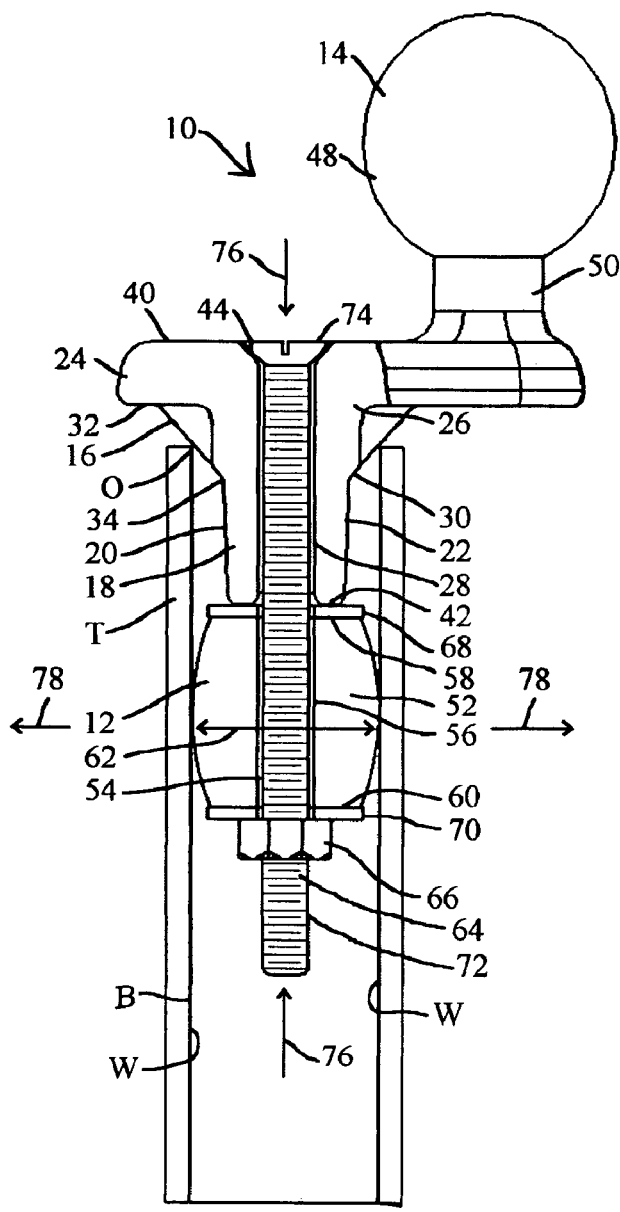
Fig. 3
Fig. 4

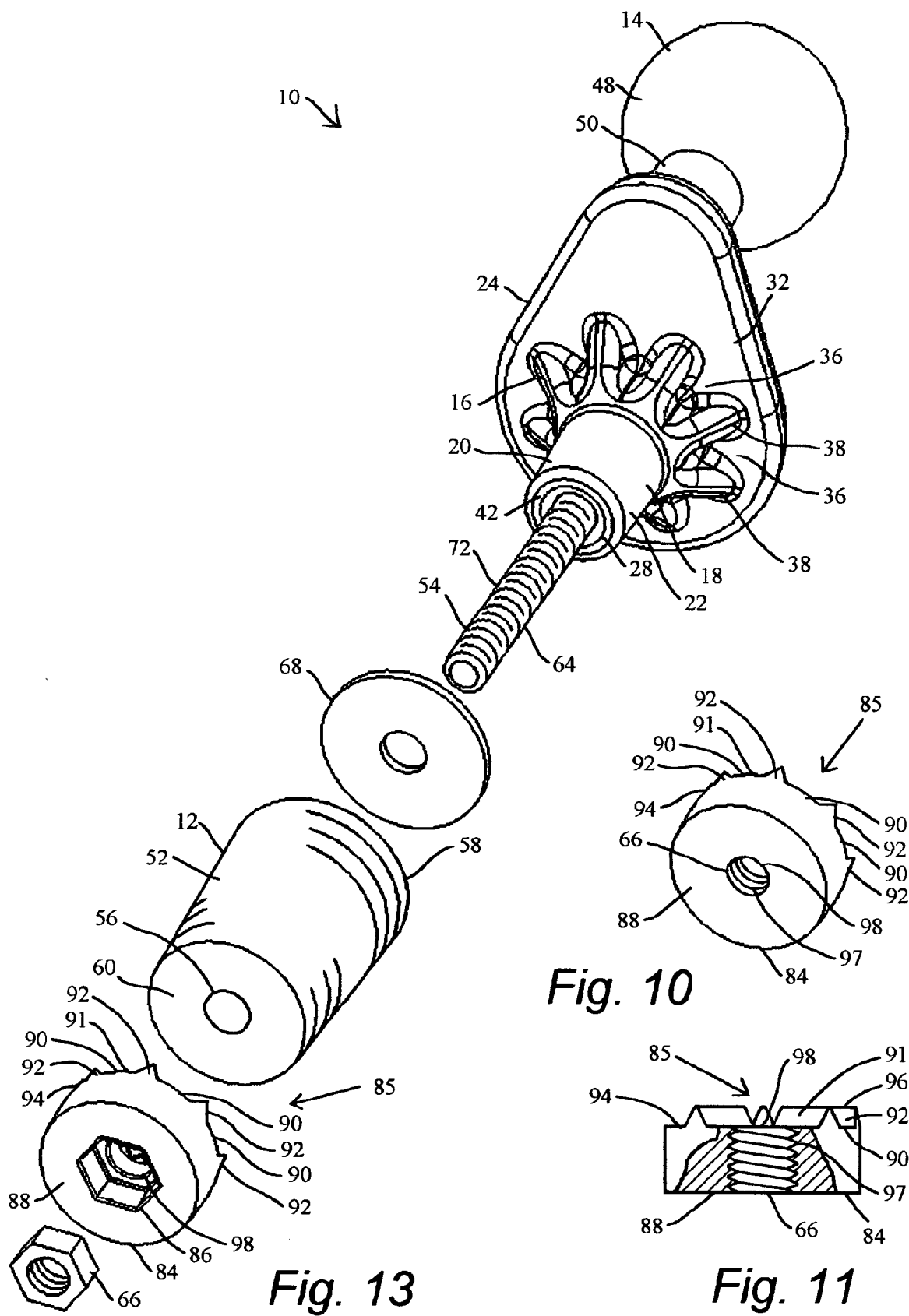

ANCHOR MOUNT

This application claims priority benefit of U.S. Provisional Patent Application Ser. No. 60/853,597 for "Anchor Mount" filed in the name of Jeffrey D. Carnevali on Oct. 23, 2006, the complete disclosure of which is incorporated herein by reference.

FIELD OF THE INVENTION

The present invention relates generally to a hole plug assembly for filling and clamping the interior of a hole in a tube or other device or other structure, and in particular to hole plug assemblies for pipes and other tube and having apparatus thereon for mounting thereto.

BACKGROUND OF THE INVENTION

Pipe and tube hole plugs are generally well-known as having a tubular or conical shaped compressible member and another member for compressing the compressible member along its longitudinal axis, which in turn expands the compressible member crosswise of its longitudinal axis.

However, known pipe and tube hole plug apparatus are limited in their ability to provide efficient and reliable mounting apparatus external of the plugged pipe or tube.

SUMMARY OF THE INVENTION

The present invention is an improved anchor mount with a novel internal anchor and an external mounting apparatus formed with an integral centering mechanism. The novel anchor mount has particular utility in efficiently and reliably providing a mounting apparatus securely but removably clamped external to a pipe or tube, including a handlebar tube of a motorcycle, snowmobile, personal watercraft or water bike, or all terrain vehicle (ATV) of generally well known manufacture.

The novel external mounting apparatus includes a stopper having a substantially rigid body formed with a relatively narrow elongated and slightly tapered internal stem portion that is sized to fit through the opening in the pipe or tube and extend into the bore. An integral flange is joined adjacent to one end, and a central bore extends through the flange and the length of the internal stem. A centering mechanism tapers away from the flange at a slope in the range of about 30 and 60 degrees from a wide skirt at an underside of the flange and substantially blends into an outer wall of the internal stem approximately midway along its length. The skirt of the centering mechanism extends substantially all around the internal stem, but may be interrupted intermittently, as by crenellations between regularly spaced substantially solid merlons. The slightly tapered internal stem portion allows the stopper portion of the external mounting apparatus to fit into different pipes or tubes having a wide range of different size bores. The widely tapering skirt of the centering mechanism interferes with the pipe or tube material around the opening over that same wide range of different size bores for substantially centering the slightly tapered internal stem in the bore. An internal axial bore extends longitudinally through the internal stem between an outer surface of the flange and a distal end surface opposite from the flange. Optionally, a counter-bore or countersink (shown) is formed in the mouth of the internal axial bore where it opens at the flange outer surface.

A part-spherical coupler is extended from the flange opposite from the tapered internal stem on another rigid presentation stem that is necked-down to be smaller than the part-spherical coupler. The part-spherical coupler is, by example and without limitation, radially resiliently compressible because it is molded of a resiliently deformable neoprene rubber or other resiliently deformable elastomer suitable for forming an alternately relatively rotatable and mutually interlockable ball-and-socket joint with pair of socket portions having substantially smooth part spherical surfaces at the inner peripheries thereof. Such a part-spherical coupler and suitable pair of socket portions are disclosed, by example and without limitation, by the inventor of the present invention in U.S. Pat. No. 5,845,885 "Universally Positionable Mounting Device" issued Dec. 8, 1998, which is incorporated in its entirety herein by reference. Here, the part-spherical coupler is eccentric relative to the centering mechanism and the internal axial bore through the internal stem. Accordingly, unimpeded access is provided to the mouth of the internal axial bore where it opens at the flange outer surface.

The internal anchor includes a compressible, resilient plug body and a releasable compression mechanism. According to one aspect of the invention, the resilient plug body is radially resiliently compressible because it is molded of resiliently deformable neoprene rubber or other resiliently deformable elastomer. The plug body may be substantially cylindrical or may have a slight taper (shown). An internal axial bore extends longitudinally through the resilient plug body between opposing near and far end outer surfaces.

The compression mechanism compresses the plug body to expand between opposed rigid surfaces. An axial compressive force applied by the compression mechanism causes the plug circumference to increase for tightly clamping the plug between the walls forming the interior bore of the pipe or tube. The internal anchor design ensures the external mounting apparatus is securely clamped into the pipe or tube.

Operation of the compression mechanism on the resilient plug body of the internal anchor ensures the internal stem portion of the stopper is securely centered in bore of the pipe or tube. Simultaneously, the centering mechanism ensures the flange portion of the stopper is centered relative to the opening into the bore of the pipe or tube and remains substantially centered without appreciable wobble when side loads are applied.

According to another aspect of the novel external mounting apparatus, the releasable compression mechanism of the novel internal anchor is formed of a threaded screw or bolt operating in conjunction with a threaded nut and a pair of washers. However, one of the washers near the internal stem of the stopper may be replaced by the end surface of the stopper distal from the flange. The resilient plug body is positioned between the washers (or between the single washer and the distal end surface of the internal stem of the stopper) with its axial bore substantially aligned with central holes through the two washers and with the internal axial bore through the internal stem portion of the stopper. The screw body is extended through the internal axial bore of the stem, through the near washer, through the internal axial bore through the resilient plug body, through the second far washer, and mates with the nut on the far side of the second far washer.

During installation of the anchor mount of the novel external mounting apparatus the screw and nut of the compression mechanism are initially engaged but loose, with the internal stem portion of the stopper, the resilient plug body, and the two washers strung loosely along the screw's body. The resilient plug body is thus presented in an initially uncompressed state wherein it is relatively elongated and narrow. Insertion into the tube bore is achieved by simply dropping the device plug end first into the bore. The plug body and washers and roughly, but loosely, center the compression mechanism in the tube bore. The internal stem portion of the stopper fits loosely in the bore, but the skirt at the underside of the stopper flange interferes with the material around the tube opening and substantially centers the narrower internal stem in the tube bore.

According to another aspect of the novel external mounting apparatus, subsequent tightening of the screw in the nut compresses the plug body between the washers (or between the single washer and the distal end surface of the internal stem of the stopper), which forces the plug body to expand between opposed rigid wall surfaces of the tube bore. Thus, the axial compressive force applied by the compression mechanism causes the plug circumference to increase for tightly clamping the plug body between the walls of the tube bore, which simultaneously centers the distal end of the internal stem portion of the stopper. Simultaneously, the centering mechanism ensures the flange portion of the stopper is centered relative to the opening into the tube bore by means of the skirt portion of the stopper flange interfering with the material around the tube opening. Additionally, the centering mechanism ensures the flange portion of the stopper remains substantially centered in the tube opening without appreciable wobble when side loads are applied. The eccentricity of the part-spherical coupler relative to the centering mechanism permits the coupler to positioned peripheral to the bore in an unlimited number of different orientations to the pipe or tube.

According to another aspect of the novel external mounting apparatus, the part-spherical coupler is substantially aligned with the centering mechanism so that it is positioned substantially concentric with the bore in the pipe or tube. Accordingly, the presentation stem having the coupler is joined to the screw portion of the compression mechanism. By example and without limitation, the screw is integral with the presentation stem. Alternatively, the presentation stem is internally threaded, and a threaded rod is threaded into the stem in substitution for the screw. Other conventional means for joining the screw or another threaded rod with the presentation stem are also contemplated and may be substituted without departing from the spirit and scope of the invention. A means for gripping the presentation stem is provided for turning the screw body relative to the nut. By example and without limitation, the gripping means may be a series of flats regularly distributed about the periphery of the presentation stem. The screw is tightened, for example, by application of an appropriate tool, e.g., wrench, to the gripping means. Alternatively, the gripping means may be knurling or other upsetting of the material around the periphery of the presentation stem, or a pair of wings or other finger gripping means, whereby the screw is tightened without application of a tool other than the installer's fingers.

Another advantage of the tapering centering mechanism of the invention is that the relatively narrow elongated internal stem portion of the stopper is able to be inserted into a relatively narrow tube bore, and a relatively narrow portion along the slope of the tapering skirt of the centering mechanism relatively near the internal stem engages the tube material around the relatively narrow opening of the bore. Alternatively, the bore of the tube is significantly larger. The relatively narrow elongated internal stem portion of the stopper is still able to be inserted into the larger tube bore. However, the centering mechanism on the underside of the flange sits more deeply in the tube bore with a relatively wider portion along the slope of the tapering skirt near the underside of the flange engages the tube material around the relatively wide opening of the bore. Engagement of the centering mechanism with the opening of the bore substantially centers the flange portion of the stopper in the opening of wider tube bore. The narrower internal stem portion of the stopper is substantially centered by engagement of the expanded plug body portion of the releasable compression mechanism of the internal anchor.

The relatively wider or narrower plug bodies are optionally substituted for use in relatively wider or narrower tube bores. However, the resilient plug body of a single width is expandable over a wide range and provides effective clamping for ensuring the external mounting apparatus is securely clamped into the pipe or tube having internal bores of a wide range of different diameters.

According to another aspect of the novel external mounting apparatus, the releasable compression mechanism of the novel internal anchor includes a novel anti-rotation mechanism for rotationally restraining the nut from turning relative to the resilient plug body while the threaded screw or bolt is turned.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a cross-section view showing by example and without limitation one example of the novel anchor mount;

FIG. 4 is another cross-section view showing by example and without limitation one example of the novel anchor mount;

FIGS. 10 and 11 both illustrate by example and without limitation another configuration of the end cap having the thread mechanism incorporated into an internal axial bore formed there through, wherein FIG. 10 is a perspective view of the exemplary end cap, and FIG. 11 is an partial section-view of the exemplary end cap;

FIG. 13 is another partial exploded view of the novel anchor mount; and

FIGS. 14 through 18 illustrate by example and without limitation different applications of the novel anchor mount, wherein FIG. 14 shows an example of a motorcycle having the anchor mount thereof removably coupled to a steering handle thereof, FIG. 15 shows an example of an all terrain vehicle (ATV) having the anchor mount removably coupled to a steering handle thereof, FIG. 16 shows an example of another tracked all terrain vehicle (ATV) having the anchor mount removably coupled to a steering handle thereof, FIG. 17 shows an example of a tracked snowmobile having the anchor mount removably coupled to a steering handle thereof, and FIG. 18 shows an example of a personal watercraft or water bike having the anchor mount removably coupled to a steering handle thereof.

DETAILED DESCRIPTION OF PREFERRED EMBODIMENT

In the Figures, like numerals indicate like elements.

Figures 1, 2:
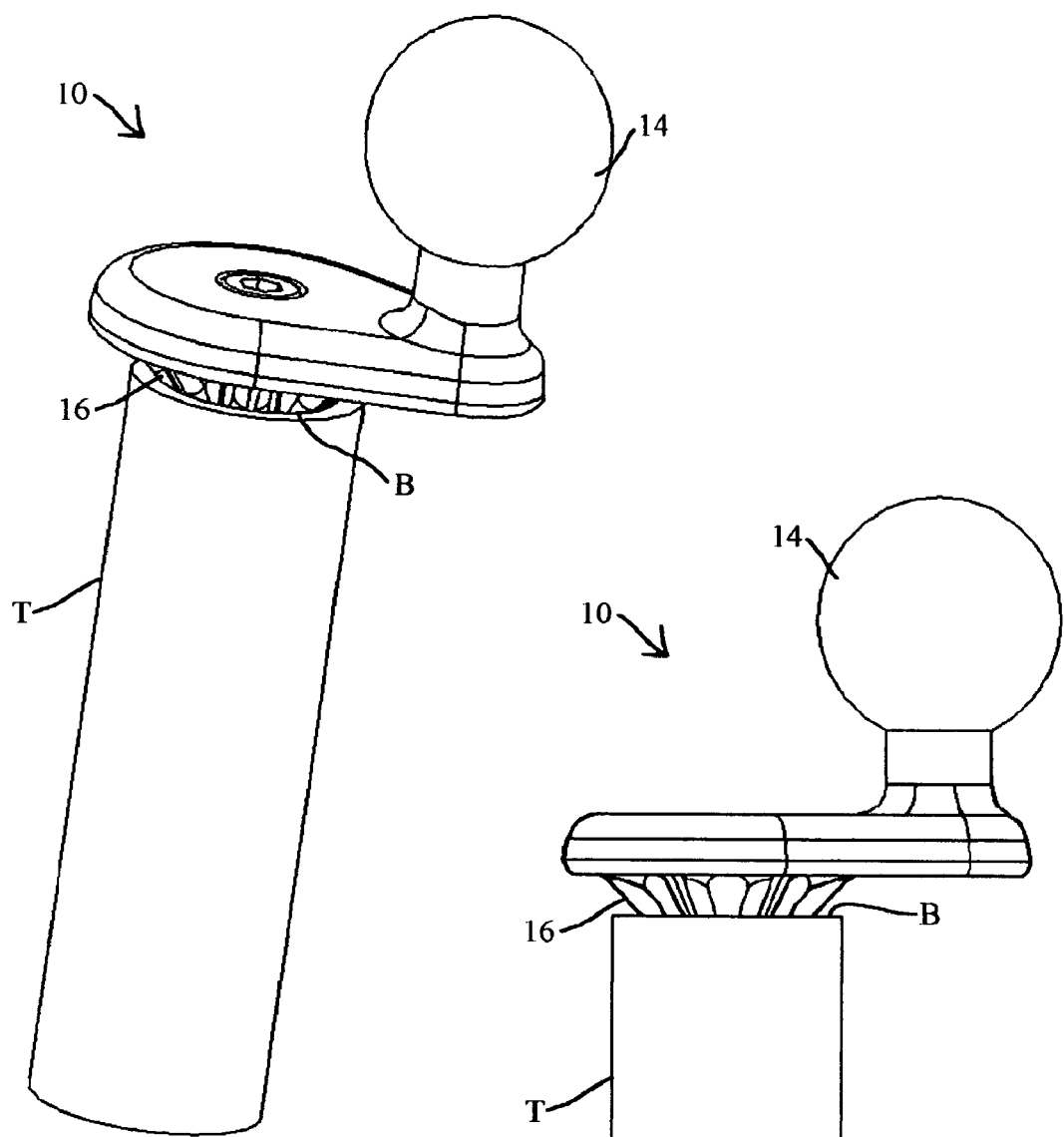
FIG. 1 is a perspective view showing by example and without limitation one example of a novel anchor mount.
FIG. 2 is an elevation view showing by example and without limitation one example of the novel anchor mount.

FIG. 1 is a perspective view and FIG. 2 is an elevation view both showing an anchor mount 10 of the invention having an internal anchor 12 (shown in subsequent views) and an external mounting apparatus 14 formed with an integral centering mechanism 16. The anchor mount 10 has particular utility in efficiently and reliably providing a mounting apparatus securely but removably clamped external to a pipe or tube T having an internal bore B, including a handlebar tube of a motorcycle, snowmobile, personal watercraft or water bike, or all terrain vehicle (ATV) each of generally well known manufacture.

FIG. 3 is a cross-section view of the anchor mount 10 of the invention. The external mounting apparatus 14 includes a stopper 18 having a substantially rigid body 20 formed with a relatively narrow elongated internal stem portion 22 that is sized to fit through an opening O in the pipe or tube T and extend into the bore B. By example and without limitation, the internal stem portion 22 may be substantially cylindrical or may have a slight taper (shown). Alternatively, the internal stem portion 22 is substantially cubical or rectangular in cross-section and may be stretched into an elongated cubical shape and may include a slight taper (shown). Other non-round and non-square cross-sectional shapes are also contemplated and may be substituted without deviating from the scope and intent of the present invention. An integral thrust flange 24 is joined to the internal stem 22 adjacent to one proximal end 26, and a longitudinal axial bore 28 extends through the flange 24 and the length of the internal stem 22. The centering mechanism 16 tapers away from the flange 24 at a slope of about 45 degrees (or a steeper or gentler slope between about 30 and 60 degrees) from a wide skirt 30 at an underside 32 of the flange 24 and substantially blends into an outer wall 34 of the internal stem 22 approximately midway along its length. The skirt portion 30 of the centering mechanism 16 is generally conical in shape when the internal stem portion 22 is generally cylindrical, is generally pyramidal in shape when the internal stem portion 22 is generally cubical. The skirt portion 30 of the centering mechanism 16 extends substantially all around the internal stem 22, but may be interrupted intermittently, as by crenellations 36 between adjacent regularly spaced substantially solid merlons 38. The slightly tapered internal stem portion 22 allows the stopper portion 18 of the external mounting apparatus 14 to fit into different pipes or tubes T having a wide range of different size bores B. The widely tapering skirt 30 of the centering mechanism 16 interferes with the pipe or tube material around the opening O over that same wide range of different size bores B for substantially centering the slightly tapered internal stem 22 in the bore B. The internal axial bore 28 extends longitudinally through the internal stem 22 between an outer end surface 40 of the flange 24 and a distal end surface 42 opposite from the flange 24. Optionally, a recess 44, such as a counterbore or countersink (shown), is formed in a mouth 46 of the internal axial bore 28 where it opens at the flange's outer surface 40.

A part-spherical coupler 48 is extended from the outer surface 40 of the flange 24 opposite from the tapered internal stem 22 on a rigid presentation stem 50 that is necked-down to be smaller than the part-spherical coupler 48. The part-spherical coupler 48 is, by example and without limitation, radially resiliently compressible because it is molded of a resiliently deformable neoprene rubber or other resiliently deformable elastomer suitable for forming an alternately relatively rotatable and mutually interlockable ball-and-socket joint with pair of socket portions having substantially smooth part spherical surfaces at the inner peripheries thereof. Such a part-spherical coupler 48 and suitable pair of socket portions are disclosed, by example and without limitation, by the inventor of the present invention in U.S. Pat. No. 5,845,885 "Universally Positionable Mounting Device" issued Dec. 8, 1998, which is incorporated in its entirety herein by reference. Here, the part-spherical coupler 48 is eccentric relative to the centering mechanism 16 and the internal axial bore 28 through the internal stem 22. Accordingly, unimpeded access is provided to the mouth 46 of the internal axial bore 28 where it opens at the flange outer surface 40.

The internal anchor 12 includes a compressible, resilient plug body 52 and a releasable compression mechanism 54. According to one aspect of the invention, the resilient plug body 52 is radially resiliently compressible because it is molded of resiliently deformable neoprene rubber or other resiliently deformable elastomer. By example and without limitation, the plug body 52 may be substantially cylindrical or may have a slight taper (shown). Alternatively, the plug body 52 is substantially cubical or rectangular in cross-section and may be stretched into an elongated cubical shape and may include a slight taper (shown). Other non-round and non-square cross-sectional shapes are also contemplated and may be substituted without deviating from the scope and intent of the present invention. An internal axial bore 56 extends longitudinally through the resilient plug body 52 between opposing near and far end outer surfaces 58 and 60.

The compression mechanism 54 compresses the plug body 52 to expand between opposed rigid surfaces. An axial compressive force applied by the compression mechanism 54 causes the plug circumference 62 to increase for tightly clamping the plug between substantially rigid walls W forming the interior bore B of the pipe or tube T. The internal anchor 12 design ensures the external mounting apparatus 14 is securely clamped into the pipe or tube T.

Operation of the compression mechanism 54 on the resilient plug body 52 of the internal anchor 12 ensures the internal stem portion 22 of the stopper 18 is securely centered in bore B of the pipe or tube T. Simultaneously, the centering mechanism 16 ensures the flange portion 24 of the stopper 18 is centered relative to the opening O into the bore B of the pipe or tube T and remains substantially centered without appreciable wobble when side loads are applied to the coupler 48.

According to another aspect of the invention, the releasable compression mechanism 54 of the internal anchor 12 is formed of a threaded fastener 64, such as a conventional bolt or screw, operating in conjunction with a pair of washers 68 and 70 and a thread mechanism 66, such as a conventional nut. However, one of the washers 68 near the internal stem 22 of the stopper 18 may be replaced by the end surface 42 of the stopper 18 distal from the flange 24. The resilient plug body 52 is positioned between the washers 68, 70 (or between the single washer 70 and the distal end surface 42 of the internal stem 22 of the stopper 18) with its axial bore 56 substantially aligned with central holes through the two washers 68, 70 and with the internal axial bore 28 through the internal stem portion 22 of the stopper 18. A threaded shaft 72 of the screw 64 is extended through the internal axial bore 28 of the internal stem 22, through the near washer 68, through the internal axial bore 56 through the resilient plug body 52, through the second far washer 70, and mates with the nut 66 on the far side of the second far washer 70.

As illustrated here, during installation of the anchor mount 10 of the invention the screw 64 and nut 66 of the compression mechanism 54 are initially loosely engaged with the internal stem portion 22 of the stopper 18, the resilient plug body 52, and the two washers 68, 70 strung loosely along the screw's shaft 72. The resilient plug body 52 is thus presented in an initially uncompressed state wherein it is relatively elongated and narrow. Insertion into the tube bore B is achieved by simply dropping the device plug-end first into the bore B. The plug body 52 and washers 68, 70 and roughly, but loosely, center the compression mechanism 54 in the tube bore B. The internal stem portion 22 of the stopper 18 fits loosely in the bore B, but the skirt 30 at the underside 32 of the stopper flange 24 interferes with the material around the tube opening O and substantially centers the narrower internal stem 22 in the tube bore B.

FIG. 4 illustrates a head 74 of the screw 64 seated in the recess 44 at the mouth 46 of the internal axial bore 28. The recess 44 operates as a thrust seat for the head 74 of the screw 64 during subsequent tightening of the screw 64 in the nut 66 which compresses the plug body 52 between the washers 68, 70 (or between the single washer 70 and the distal end surface 42 of the internal stem 22 of the stopper 18). Tightening the screw 64 in the nut 66 and compressing the plug body 52 forces the plug body 52 to expand between opposed rigid wall surfaces W of the tube bore B. Thus, the axial compressive force (indicated by arrows 76) applied by the compression mechanism 54 causes the plug circumference 62 to increase (indicated by arrows 78) for tightly clamping the plug body 52 between the walls W of the tube bore B, which simultaneously centers the distal end 42 of the internal stem portion 22 of the stopper 18. Simultaneously, the centering mechanism 16 ensures the flange portion 24 of the stopper 18 is substantially centered relative to the opening O into the tube bore B by means of the skirt portion 30 of the stopper flange 24 interfering with the material around the tube opening O. Additionally, the centering mechanism 16 ensures the flange portion 24 of the stopper 18 remains substantially centered in the tube opening O without appreciable wobble when side loads are applied to the coupler 48. The eccentricity of the part-spherical coupler 48 relative to the centering mechanism 16 permits the coupler 48 to be positioned peripheral to the bore B in an unlimited number of different rotational orientations relative to the pipe or tube T.

Figure 5:
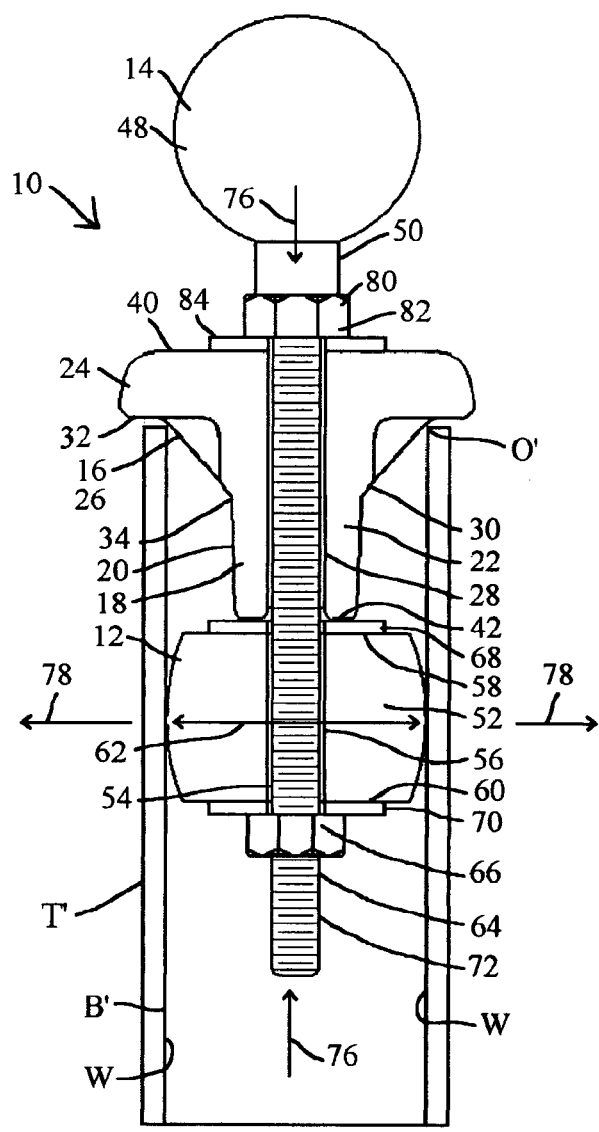
FIG. 5 a cross-section view showing by example and without limitation one alternative example of the novel anchor mount.

FIG. 5 illustrates another embodiment of the external mounting apparatus 14 wherein the part-spherical coupler 48 is substantially aligned with the centering mechanism 16 so that it is positioned substantially concentric with a bore B' in a pipe or tube T'. Here, the presentation stem 50 having the coupler 48 is joined to the screw portion 64 of the compression mechanism 54. By example and without limitation, the screw 64 is integral with the presentation stem 50. Alternatively, the presentation stem 50 is internally threaded, and a threaded rod is threaded into the presentation stem 50 in substitution for the screw. Other conventional means for joining the screw 64 or another threaded shaft 72 with the presentation stem 50 are also contemplated and may be substituted without departing from the spirit and scope of the invention. A means for gripping 80 the presentation stem 50 is provided for turning the screw threaded shaft 72 relative to the nut 66. By example and without limitation, the gripping means 80 may be a series of flats 82 regularly distributed about the periphery of the presentation stem 50, by example and without limitation, in a square, hexagonal or octagonal pattern. The screw 64 is tightened, for example, by application of an appropriate tool, e.g., wrench, to the gripping means 80. Alternatively, the gripping means 80 may be knurling or other upsetting of the material around the periphery of the presentation stem 50, or a pair of wings or other finger gripping means, whereby the screw 64 is tightened without application of a tool other than the installer's fingers.

Comparison of FIG. 5 with FIG. 4 illustrates another advantage of the tapering centering mechanism 16 of the invention. In FIG. 4, the relatively narrow elongated internal stem portion 22 of the stopper 18 is able to be inserted into the tube T having a relatively narrow tube bore B. A relatively narrow portion along the slope of the tapering skirt 30 of the centering mechanism 16 relatively near the internal stem 22 engages the tube material around the relatively narrow opening O of the bore B. In contrast, here a bore B' of the tube T' is significantly larger than the bore B shown in FIG. 4. The relatively narrow elongated internal stem portion 22 of the stopper 18 is able to be inserted into the larger tube bore B'. The centering mechanism 16 on the underside 32 of the flange 24 sits more deeply in the tube bore B' and a relatively wider portion along the slope of the tapering skirt 30 near the underside 32 of the flange 24 engages the tube material around the relatively wide opening O' of the bore B'. Engagement of the centering mechanism 16 with the wider opening O' of the wider bore B' substantially centers the flange portion 24 of the stopper 18 in the opening O' of wider tube bore B'. The narrower internal stem portion 22 of the stopper 18 is substantially centered by engagement of the expanded plug body 52 portion of the releasable compression mechanism 54 of the internal anchor 12.

The relatively wider or narrower plug bodies 52 are optionally substituted for use in relatively narrower tube bores B or wider tube bores B'. However, the resilient plug body 52 of a single width is expandable over a wide range and provides effective clamping for ensuring the external mounting apparatus 14 is securely clamped into a wide range of different sizes of the pipes or tubes T through T' having respective internal bores B through B' of a wide range of different diameters.

Figure 6:
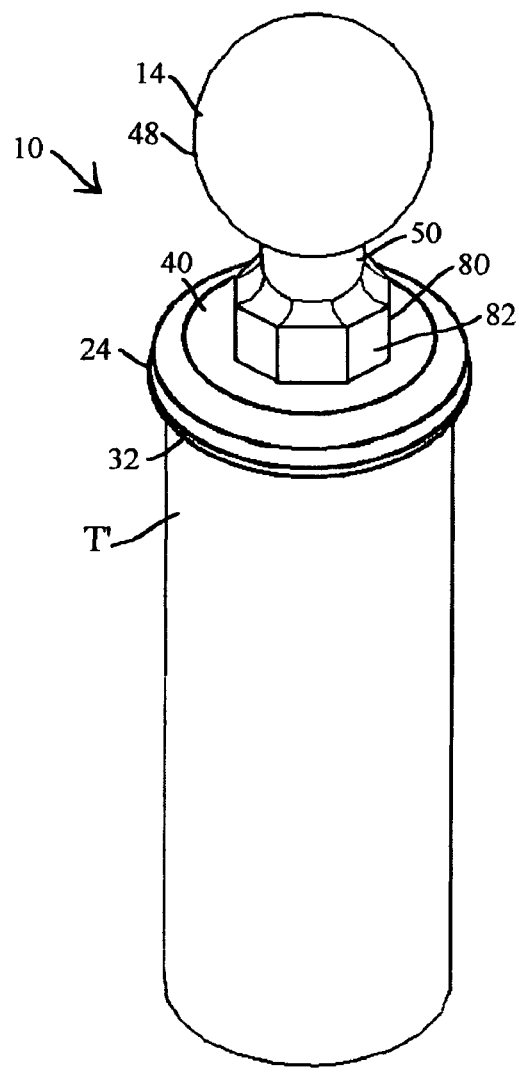
FIG. 6 is a perspective view showing the example of the alternative novel anchor mount illustrated in FIG. 5

FIG. 6 is a perspective view showing the example of the alternative anchor mount of the invention illustrated in FIG. 5.

Figures 7, 8:
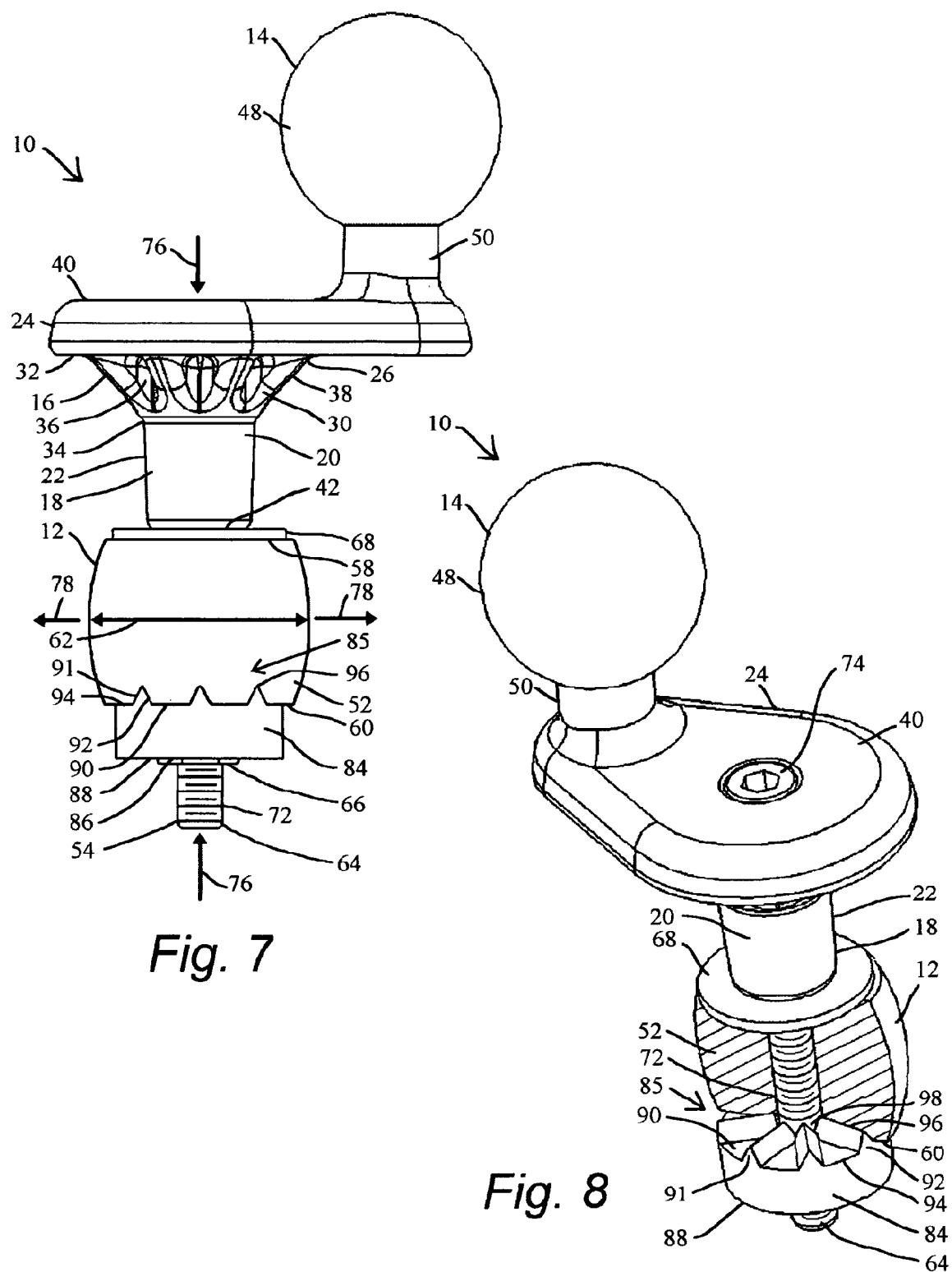
FIG. 7 illustrates the novel anchor mount by example and without limitation having a releasable compression mechanism compressing a resilient plug body between a stem portion of a rigid stopper and an end cap that is structured with a novel anti-rotation means for resisting rotation of a thread mechanism during installation and subsequent tightening of a threaded fastener.
FIG. 8 illustrates a first portion of the novel anti-rotation means embodied by example and without limitation as a substantially uniform radial pattern of alternating spaces or crenellations and substantially rigid teeth or merlons formed on a near end face of the end cap.

FIG. 7 illustrates the anchor mount 10 outside the tube T. Here, the second washer 70 against the far end outer surface 60 of the resilient plug body 52 of the internal anchor 12 is replaced by a substantially rigid end cap 84 that is structured with an anti-rotation means for resisting rotation of the nut 66 during installation and subsequent tightening of the threaded fastener 64 of the releasable compression mechanism 54. Furthermore, the anti-rotation means for resisting rotation of the nut 66 during installation and tightening of the threaded fastener 64 also operates as means for resisting rotation of the nut 66 during loosening of the threaded fastener 64 relative to the nut 66 for subsequent removal of the anchor mount 10 from the tube T. Here, the anti-rotation means for resisting rotation of the nut 66 relative to the screw 64 includes a first anti-rotation mechanism 85 for resisting rotation of end cap 84 relative to the plug body 52 of the internal anchor 12 in combination with a second anti-rotation mechanism 86 for resisting rotation of the nut 66 relative to the end cap 84.

As illustrated here by example and without limitation, the second anti-rotation mechanism 86 for resisting rotation of the nut 66 relative to the end cap 84 is a nut-shaped retention recess or "nut pocket" sunk in the approximate center of an outer end face 88 of the end cap 84 distal from the plug body 52, as more clearly shown in one or more subsequent views. The first anti-rotation mechanism 85 for resisting rotation of end cap 84 relative to the plug body 52 is illustrated here by example and without limitation as a plurality of rotation resistors 91 coupled between a near end face 94 of the end cap 84 and the far end outer surface 60 of the resilient plug body 52. Here, the plurality of rotation resistors 91 are illustrated by example and without limitation as several spaces or crenellations 90 between adjacent regularly spaced substantially rigid teeth or merlons 92 formed on the near end face 94 of the end cap 84 adjacent to the far end outer surface 60 of the plug body 52. Here, the substantially rigid teeth or merlons 92 are formed with a generally triangular shape. However, other rectangular or configurations are also contemplated and may be substituted without departing from the spirit and scope of the invention.

In operation, the screw 64 is initially tightened relative to the nut 66 sufficiently to draw the nut 66 into the anti-rotation nut pocket mechanism 86, while the plug body 52 remains uncompressed, and therefore, unexpanded. The nut 66 and screw 64 of the releasable compression mechanism 54 are optionally further tightened sufficiently to drive outermost tips 96 of the merlons 92 into the plug body 52 for lightly restraining the end cap 84 without compressing the plug body 52.

After the anchor mount 10 is fit into the tube bore B, as discussed herein, the screw 64 is rotated relative to the nut 66. When the screw 64 is rotated relative to the nut 66, the end cap 84 restrains the nut 66 from rotating relative to the plug body 52 by biting into the resilient far end outer surface 60 of the plug body 52. As the screw 64 is tightened relative to the nut 66, the end cap 84 is drawn against the far end outer surface 60 of the plug body 52 and applies the axial compressive force (indicated by arrows 76) which causes the plug circumference 62 to increase against the wall surfaces W of the tube bore B, as discussed here. Application of the compressive force (indicated by arrows 76) forces the merlons 92 to dig into the far end outer surface 60 of the plug body 52, whereby the restraint against relative rotation applied to the nut 66 by the anti-rotation nut pocket mechanism 86 increases proportionately. Furthermore, as the plug circumference 62 increases (indicated by arrows 78), the plug body 52 is more tightly clamped between the walls W of the tube bore B, as discussed herein. Thus, as the compression mechanism 54 is operated, expansion (indicated by arrows 78) of the plug body 52 in the tube bore B, as discussed herein, causes the plug body 52 to operate through the end cap 84 for more effectively resisting rotation of the nut 66 until the anchor mount 10 is fully anchored in the tube bore B.

FIG. 8 illustrates the alternating spaces or crenellations 90 and substantially rigid teeth or merlons 92 formed on the near end face 94 of the end cap 84 portion of the anchor mount 10 by showing a cross-section view of the plug body 52 of the internal anchor 12. The alternating crenellations 90 and merlons 92 are illustrated here, by example and without limitation, as optionally radiating from a central passage or internal axial bore 98 formed through the end cap 84 with the threaded shaft 72 of the screw 64 extended there through. The alternating crenellations 90 and merlons 92 thus optionally form a star shape on the near end face 94 of the end cap 84. Consequently, the outermost tips 96 of the generally triangular merlons 92 are elongated into radial ridges. However, other configurations are also contemplated and may be substituted without departing from the spirit and scope of the invention.

Figures 9, 12:
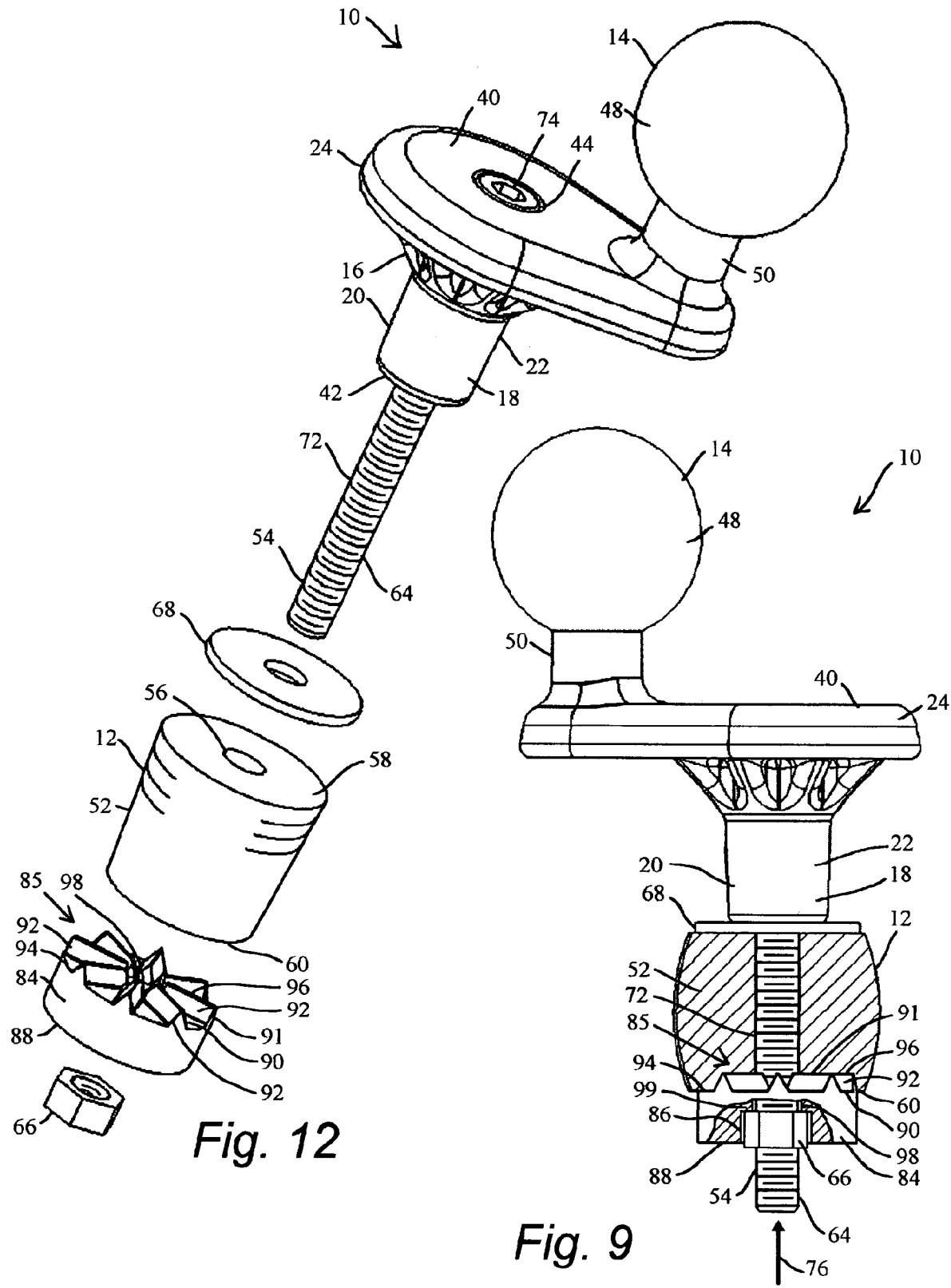
FIG. 9 illustrates a second portion of the novel anti-rotation mechanism embodied by example and without limitation as a nut-shaped retention recess or "nut pocket" sunk in an outer end face of the end cap.
FIG. 12 is a partial exploded view of the novel anchor mount.

FIG. 9 illustrates the second anti-rotation mechanism 86 of the anchor mount 10 as the nut-shaped retention recess or "nut pocket" sunk in the outer end face 88 of the end cap 84, which operates as one part of the means for resisting rotation of the nut 66 relative to the plug body 52 of the internal anchor 12. The anti-rotation nut pocket 86 is shown in a partial cut-away cross-section view of the end cap 84, by example and without limitation, as a hexagonal socket when the nut 66 is a hexagonal-style nut. However, the anti-rotation nut pocket 86 is optionally a square or octagonal socket when the nut 66 is a square-style or octagonal-style nut, respectively. Alternatively, the anti-rotation nut pocket 86 is optionally any proprietary shape when the nut 66 is a matching proprietary design. The anti-rotation nut pocket 86 is optionally even a cylindrical shape when the nut 66 is a cylindrical shape having a serrated or knurled exterior surface structured to grip the anti-rotation nut pocket 86. Alternatively, the nut 66 is optionally fused into the anti-rotation nut pocket 86, as by ultrasonic welding, for example. Accordingly, the anti-rotation nut pocket 86 is illustrated only by example and without limitation as a hexagonal socket, and alternative means for retaining the nut 66 relative to the end cap 84 are also contemplated and may be substituted without departing from the spirit and scope of the invention.

The internal axial bore 98 formed through the center of the end cap 84 is also shown with the threaded shaft 72 of the screw 64 extended there through. The axial bore 98 intersects with the anti-rotation nut pocket 86 such that the nut 66 can be seated in the anti-rotation nut pocket 86 and threaded onto the shaft 72 of the screw 64. Intersection of the axial bore 98 with the larger nut pocket 86 forms a thrust flange 99 internal of the end cap 84 for operating the nut 66 on the shaft 72 of the screw 64 in squeezing the plug body 52. Here, the nut 66 is seated in the anti-rotation nut pocket 86 and threaded onto the shaft 72 of the screw 64 applying the axial compressive force (indicated by arrows 76) against the internal thrust flange 99 of the end cap 84, which as discussed herein causes the plug circumference 62 to increase against the wall surfaces W of the tube bore B.

FIG. 10 is a perspective view and FIG. 11 is an end view both illustrating another configuration of the end cap 84 having the thread mechanism 66 incorporated into the internal axial bore 98 formed there through. Accordingly, the internal axial bore 98 is formed with threads 97 matched to the threaded shaft 72 of the fastener 64. The nut 66 is thus eliminated. The rotation resistors 91 of the first anti-rotation mechanism 85 thus operate directly as the anti-rotation means for resisting rotation of the thread mechanism 66 relative to the plug 52.

FIG. 12 is a partial exploded view of the anchor mount 10. Here, the shaft 72 of the screw 64 is inserted through longitudinal internal axial bore 28 through the flange 24 and the length of the internal stem 22 of the body portion 20 of the stopper 18, as discussed herein. The head 74 of the screw 64 is seated in the recess 44 at the mouth 46 of the internal axial bore 28. The shaft 72 of the screw 64 thus extends from the distal end surface 42 of the internal stem 22 of the stopper 18 and through the washer 68, when present. The longitudinal internal axial bore 56 at the near end outer surface 58 of the resilient plug body 52 of the internal anchor 12 is fit over the screw shaft 72 until it protrudes out the far end outer surface 60 adjacent to the end cap 84. The central internal axial bore 98 of the end cap 84 is fit over the screw shaft 72 with the first anti-rotation mechanism 85 for resisting rotation of end cap 84 relative to the plug body 52, e.g., illustrated here by example and without limitation as rotation resistors 91 being formed as the pattern of regularly spaced spaces or crenellations 90 and substantially rigid teeth or merlons 92 formed in the near end face 94 of the end cap 84, facing toward the far end outer surface 60 of the plug body 52. The nut 66 is threadedly mated onto the shaft 72 of the screw 64 on the far side of the end cap 84 opposite from the resilient plug body 52 of the internal anchor 12. The second anti-rotation mechanism 86 is operated for resisting rotation of the nut 66 relative to the end cap 84. For example, as illustrated here by example and without limitation, the nut 66 is drawn into the anti-rotation nut pocket 86 by turning the screw 64, which moves the nut 66 along the screw shaft 72 toward the head 74. Turning the screw 64 is the means for operating the compression mechanism 54, whereby the axial compressive force (indicated by arrows 76) is applied, as discussed herein. The anti-rotation means thus combines the first and second anti-rotation mechanisms 85 and 86 for resisting rotation of the nut 66 relative to the plug body 52 while tightening the screw 64.

FIG. 13 is another partial exploded view of the anchor mount 10 showing the central internal axial bore 98 of the end cap 84 that fits over the shaft 72 of the screw 64. The first anti-rotation mechanism 85 for resisting rotation of end cap 84 relative to the plug body 52 is illustrated here as the pattern of crenellations 90 and merlons 92 on the near end face 94 of the end cap 84 adjacent to the far end outer surface 60 of the plug body 52. This view also shows the second anti-rotation mechanism 86 illustrated here as the central nut-shaped retention recess or "nut pocket" 86 that is sunk in the outer end face 88 of the end cap 84 opposite from the plug body 52.

Figure 14:
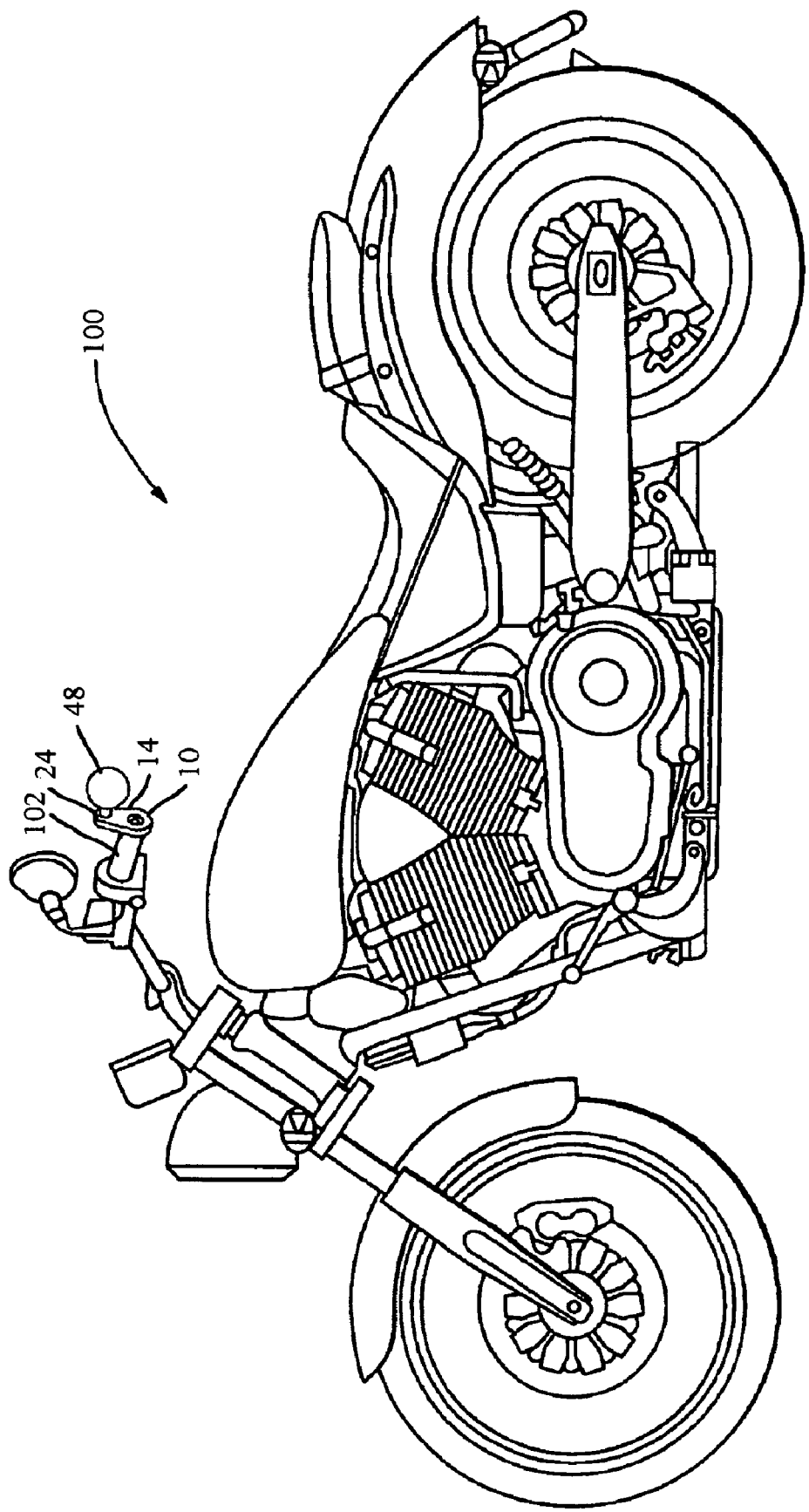

By example and without limitation, FIGS. 14 through 18 illustrate different applications of the anchor mount 10. FIG. 14, for example, shows a motorcycle 100 of generally well known manufacture having the anchor mount 10 removably coupled to a steering handle 102, with the part-spherical coupler 48 eccentrically positioned by means of the flange portion 24 of the mounting apparatus 14.

Figure 15:
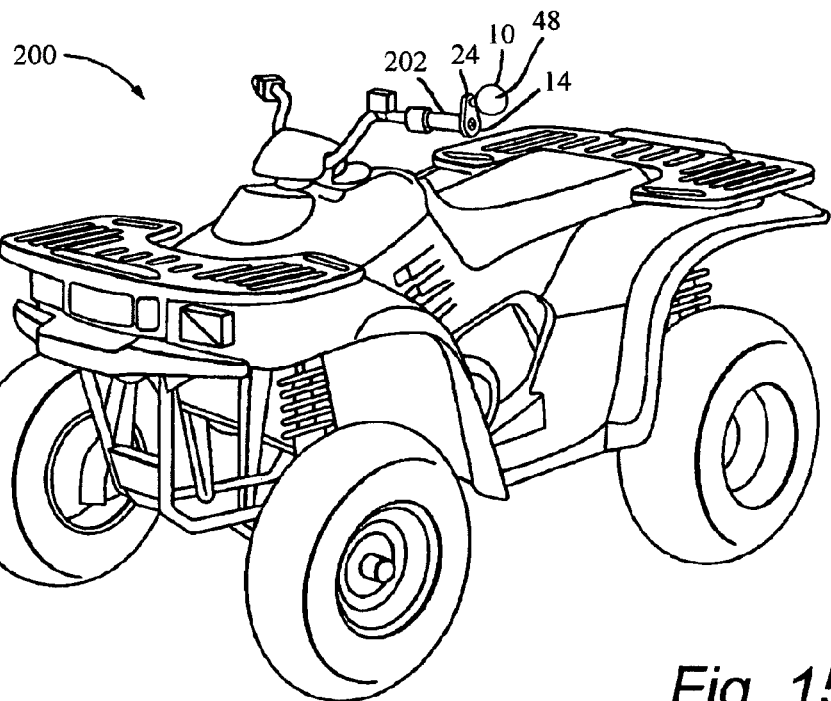

FIG. 15, for example, shows a vehicle 200, such as an all terrain vehicle (ATV) of generally well known manufacture, having the anchor mount 10 removably coupled to a steering handle 202, with the part-spherical coupler 48 eccentrically positioned by means of the flange portion 24 of the mounting apparatus 14.

Figure 16:
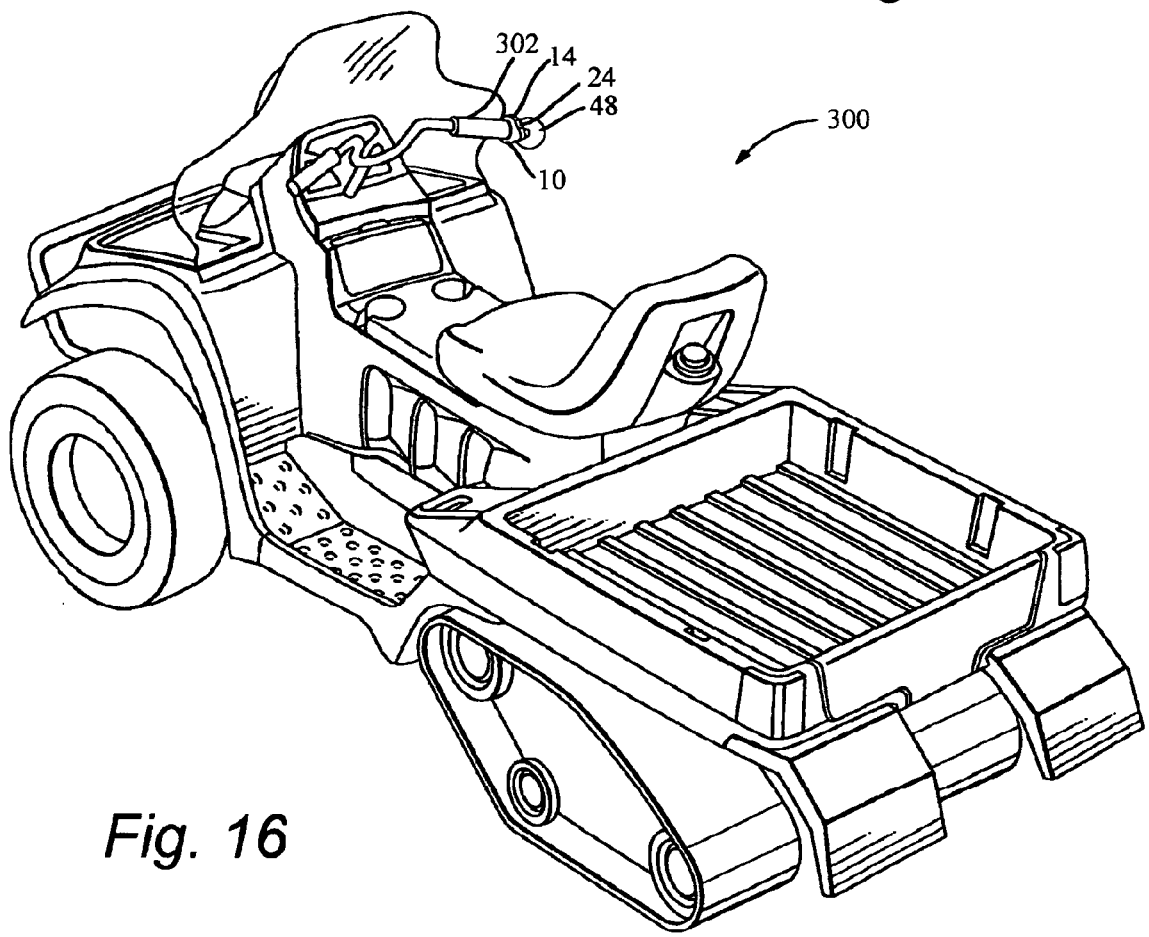

FIG. 16, for example, shows another vehicle 300, such as a tracked all terrain vehicle (ATV) of generally well known manufacture, having the anchor mount 10 removably coupled to a steering handle 302, with the part-spherical coupler 48 eccentrically positioned by means of the flange portion 24 of the mounting apparatus 14.

Figure 17:
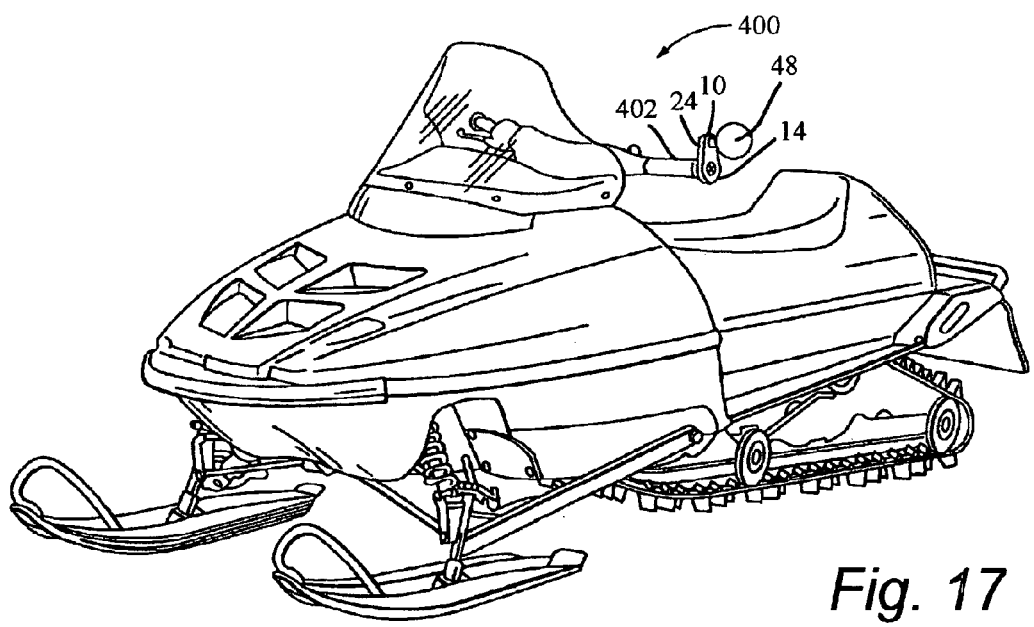

FIG. 17, for example, shows another vehicle 400, such as a tracked snowmobile of generally well known manufacture, having the anchor mount 10 removably coupled to a steering handle 402, with the part-spherical coupler 48 eccentrically positioned by means of the flange portion 24 of the mounting apparatus 14.

Figure 18:
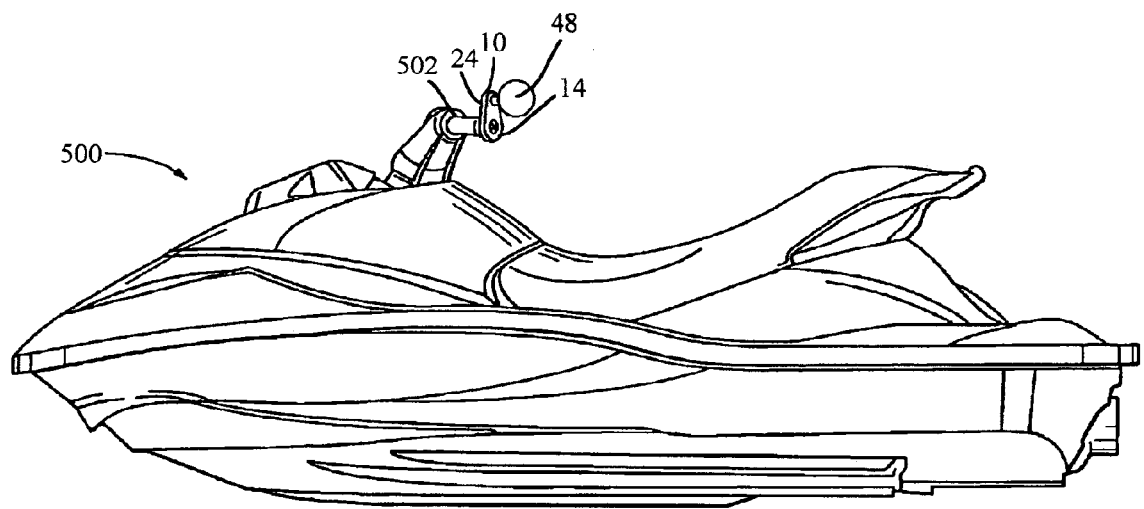

FIG. 18, for example, shows another vehicle 500, such as a personal watercraft or water bike of generally well known manufacture, having the anchor mount 10 removably coupled to a steering handle 502, with the part-spherical coupler 48 eccentrically positioned by means of the flange portion 24 of the mounting apparatus 14.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. An anchor mount, comprising:
   a substantially rigid stopper having a thrust flange joined to a first end of a stem portion with an axial bore extending between an external surface of the flange and a second end of the stem portion opposite from the flange, and a self-centering portion inclined between an overhanging portion of the flange and the stem portion and comprising a first dimension adjacent to and smaller than the overhanging portion of the flange and a second dimension distal from the flange that is smaller than the first dimension;
   a part-spherical coupler presented on the stopper thrust flange opposite from the stem portion;
   a plug positioned adjacent to the stem portion of the stopper opposite from the thrust flange thereof, the plug comprising a substantially resiliently deformable plug body having a maximum dimension between opposing first and second end surfaces thereof that is smaller than the first dimension of the self-centering portion of the stopper, and comprising an axial bore extended longitudinally there through between the opposing first and second end surfaces thereof;
   an elongated shaft extendable through the respective axial bores of the stopper and the plug and having a threaded portion thereof extendable from the second end surface of the plug when the first end surface thereof is positioned substantially adjacent to the second end of the stem portion of the stopper and the respective axial bores of the stopper and the plug being substantially aligned; and
   a substantially rigid end cap having first and second spaced apart end faces with an axial bore there between sized to receive the threaded shaft there through, the first face of the end cap being structured with an anti-rotation mechanism operable for resisting rotation of the end cap relative to the plug body when the axial bore of the end cap is received on the shaft with the first face of the end cap adjacent to the plug body; and
   means for reversibly moving the end cap along the elongated shaft relative to the second end of the stem portion.

2. The anchor mount of claim 1 wherein the means for reversibly moving the end cap further comprises a thread mechanism substantially aligned with the axial bore of the end cap and being threadedly matched to the threaded portion of the shaft.

3. The anchor mount of claim 2 wherein the anti-rotation mechanism further comprises a first anti-rotation mechanism operable between the first face of the end cap and the second end surface of the plug body, and a second anti-rotation mechanism operable between the end cap and the thread mechanism.

4. The anchor mount of claim 3 wherein the thread mechanism further comprises a nut; and
   the second anti-rotation mechanism further comprises means for rotationally restraining the nut relative to the end cap.

5. The anchor mount of claim 4 wherein the means for rotationally restraining the nut further comprises a pocket recessed into the second face of the end cap and being both sized to receive the nut at least partially thereinto and shaped to substantially conform to the nut.

6. The anchor mount of claim 4 wherein the first anti-rotation mechanism further comprises a substantially radial pattern of rotation resistors formed on the first face of the end cap.

7. The anchor mount of claim 6 wherein the self-centering portion of the stopper further comprises a substantially rigid taper extending from the first larger dimension adjacent to the flange toward the second smaller dimension that is distal from the flange.

8. The anchor mount of claim 7 wherein the plug body further comprises a taper extended between the opposing first and second end surfaces thereof.

9. The anchor mount of claim 7 wherein the stopper further comprises means for restraining the shaft from moving longitudinally of the axial bore there through toward the second end of the stem portion.

10. An anchor mount, comprising:
a stopper having a substantially rigid body formed with a thrust flange joined to a first end of a stem portion with an axial bore extending through the flange and the stem portion between a first opening in the flange and a second opening in a second end of the stem portion opposite from the flange, and a substantially rigid centering mechanism substantially surrounding the stem portion and tapering between an overhanging portion of the flange and the stem portion;
a part-spherical coupler extended from the stopper thrust flange opposite from the tapered stem portion on a substantially rigid presentation stem;
a substantially resiliently deformable plug having a truncated substantially conical body and an axial bore extended longitudinally there through between opposing first and second end surfaces thereof, wherein one of the first and second end surfaces of the plug is positioned adjacent to the second end of the stem portion of the stopper opposite from the flange thereof and the plug is compressible there against; and
a releasable compression mechanism, comprising:
an elongated shaft extendable through the substantially aligned respective axial bores of the stopper body and the plug body and having a threaded portion thereof extendable from the second end surface of the plug body when the first end surface thereof is positioned substantially adjacent to the second end of the stem portion of the stopper and a head sized to interfere with the first opening in the flange,
a substantially rigid end cap positionable adjacent to the second end surface of the plug body and having first and second spaced apart end faces with an axial bore there between sized to receive the threaded shaft there through with the first face turned toward the plug body and the second face turned away therefrom, the first face of the end cap being structured with an anti-rotation mechanism operable for resisting rotation of the end cap relative to the plug body when the axial bore of the end cap is received on the shaft with the first face of the end cap seated against the plug body, and
a thread mechanism substantially aligned with the axial bore of the end cap and being threadedly matched to receive the threaded portion of the shaft; and
wherein the substantially rigid centering mechanism of the stopper further comprises a dimension adjacent to and smaller than the overhanging portion of the flange and tapering toward the stem portion.

11. The anchor mount of claim 10 wherein the presentation stem and the part-spherical coupler extended thereon are further offset relative to the first opening in the flange.

12. The anchor mount of claim 11 wherein the thread mechanism of the releasable compression mechanism further comprises a thread formed in the axial bore of the end cap.

13. The anchor mount of claim 11 wherein the thread mechanism of the releasable compression mechanism further comprises an internally threaded nut, and
the anti-rotation mechanism of the first face of the end cap further comprises a pattern of rotation resistors substantially uniformly distributed on the first end face of the end cap; and
the releasable compression mechanism further comprises:
a nut threadedly matched to the threaded portion of the shaft, and
the second surface of the end cap forming a nut seat in substantially alignment with the axial bore thereof and being structured to substantially restrain the nut against rotation relative to the end cap.

14. The anchor mount of claim 13 wherein the nut seat of the end cap further comprises a pocket formed in the second surface of the end cap in substantially alignment with the axial bore thereof and a floor portion thereof forming an internal thrust flange substantially surrounding the axial bore, the pocket being sized to receive the nut and substantially restrain the nut against rotation relative to the end cap.

15. The anchor mount of claim 13 wherein the pattern of rotation resistors substantially uniformly distributed on the first end face of the end cap further comprises a plurality of radially oriented crenellations between adjacent regularly spaced substantially rigid merlons formed on the first end face of the end cap.

16. An anchor mount, comprising:
a stopper having a substantially rigid body formed with a relatively narrow elongated and slightly tapered truncated substantially conical stem portion, an integral thrust flange joined adjacent to a first end of the stem portion and an overhanging portion thereof overhangs the first end of the stem, an axial bore extending through the flange and the stem portion between a first opening in the flange and a second opening in a second end of the stem portion opposite from the flange, and a centering mechanism substantially surrounding the stem portion and tapering between the overhanging portion of the flange and the stem portion at a slope in the range of about 30 degrees to 60 degrees and forming a substantially rigid wide skirt portion adjacent to the overhanging portion of the flange and substantially blended into an outer wall of the stem portion approximately midway between the second end thereof and the flange;
a part-spherical coupler formed of a substantially resiliently deformable elastomer and extended from the stopper thrust flange opposite from the tapered stem portion on a substantially rigid presentation stem that is necked-down to be smaller than a diameter of the part-spherical coupler;
a plug having an elongated slightly tapered truncated substantially conical body formed of a substantially resiliently deformable elastomer and an axial bore extended longitudinally there through between opposing spaced-apart first and second end surfaces thereof, wherein one of the first and second end surfaces of the plug is positioned against the second end of the stem portion opposite from the flange; and a releasable compression mechanism operable for releasably compressing the plug body between the first and second end surfaces thereof, the releasable compression mechanism comprising:
- a fastener having an elongated shaft extendable through the substantially aligned respective axial bores of the stopper body and the plug body and having a threaded portion thereof extendable from the second end surface of the plug body when the first end surface thereof is positioned substantially adjacent to the second end of the stem portion of the stopper and a head sized to interfere with the first opening in the flange,
- a threaded nut sized to mate with the threaded portion of the shaft, and
- a substantially rigid end cap positionable between the plug body and the threaded nut and having first and second spaced apart end faces with an axial bore there between sized to receive the threaded shaft there through with the first face turned toward the plug body and the second face turned away therefrom, the end cap being structured with an anti-rotation mechanism operable between the plug body and the threaded nut for resisting rotation of the nut relative to the plug body when the axial bore of the end cap is received on the shaft with the first face seated against the plug body and the nut spaced away therefrom with seat portion of the end cap positioned there between; and wherein the plug is further compressible against the second end of the stem portion of the stopper by operation of the releasable compression mechanism.

17. The anchor mount of claim 16 wherein the presentation stem and the part-spherical coupler extended thereon are further offset relative to the first opening in the flange.

18. The anchor mount of claim 17 wherein the anti-rotation mechanism of the end cap further comprises a first anti-rotation mechanism positioned between the first end face of the end cap and the second end of the plug body, and a second anti-rotation mechanism positioned between the seat portion of the end cap and the nut.

19. The anchor mount of claim 18 wherein the first anti-rotation mechanism further comprises a substantially uniform pattern of spaced-apart teeth radially distributed on the first end face of the end cap.

20. The anchor mount of claim 19 wherein the second anti-rotation mechanism further comprises a pocket having a nut-shape substantially matching the nut and substantially aligned with the axial bore of the end cap, the seat portion of the end cap forming an internal thrust flange positioned between the nut-shaped pocket and the first end face of the end cap.

* * * * *